(12) United States Patent
Chen et al.

(10) Patent No.: US 6,203,973 B1
(45) Date of Patent: Mar. 20, 2001

(54) POLYMER LATEXES WITH CORE-SHELL MORPHOLOGY

(75) Inventors: Tienteh Chen; Edward Schofield, both of Penfield; Hwei-Ling Yau; Glenn M. Brown, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/276,074

(22) Filed: Mar. 25, 1999

(51) Int. Cl.$^7$ .................................................. G03C 1/053
(52) U.S. Cl. ........................... 430/627; 525/296; 525/303
(58) Field of Search ..................... 525/296, 303, 525/902; 430/627; 524/555, 560, 804

(56) References Cited

U.S. PATENT DOCUMENTS

| | | | |
|---|---|---|---|
| 3,409,435 | 11/1968 | Seidel et al. | 430/637 |
| 4,203,716 | 5/1980 | Chen | 430/207 |
| 4,304,769 | 12/1981 | Chen | 424/218 |
| 4,368,258 | 1/1983 | Fujiwhara et al. | 430/493 |
| 5,135,844 | 8/1992 | Bagchi et al. | 430/546 |
| 5,300,418 | 4/1994 | Visconte et al. | 430/546 |
| 5,321,056 | * 6/1994 | Carson et al. | 523/201 |
| 5,461,103 | 10/1995 | Bafford et al. | 430/537 |
| 5,594,047 | 1/1997 | Nielsen et al. | 523/315 |
| 5,756,273 | 5/1998 | Wang et al. | 524/460 |
| 5,804,357 | * 9/1998 | Yamanouchi et al. | 430/438 |
| 5,990,202 | * 11/1999 | Nguyen et al. | 523/201 |

FOREIGN PATENT DOCUMENTS

| | | |
|---|---|---|
| 695968 | 2/1996 | (EP) . |
| 727703 | 8/1996 | (EP) . |

* cited by examiner

*Primary Examiner*—Rachel Gorr
(74) *Attorney, Agent, or Firm*—Doreen M. Wells; Carl F. Ruoff

(57) ABSTRACT

The present invention is a polymer latex that includes polymer particles having a core portion and a shell portion. The core portion contains polymerized hydrophobic ethylenically unsaturated monomers with a water solubility less than 1% at room temperature. The shell portion contains polymerized monomers defined by formula (I)

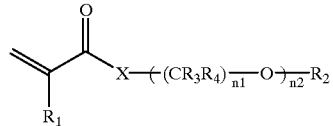

Formula (I)

wherein X is O or NH, or $NCH_3$, $R_1$ and $R_2$ are H, $CH_3$, $C_2H_5$, $C_3H_7$, or $C_4H_9$, $R_3$ and $R_4$ are H or $CH_3$, n1 and n2 are integers, n1 is from 1 to 4, n2 is from 1 to 20.

The polymer particles having a size of less than 50 nm.

8 Claims, No Drawings

POLYMER LATEXES WITH CORE-SHELL MORPHOLOGY

FIELD OF THE INVENTION

The present invention describes small polymer particles that are useful in silver halide applications. More specifically, the present invention is concerned with polymer particles having a size less than 50 nm and have minimum interaction with gelatin.

BACKGROUND OF THE INVENTION

Polymer latex has been used extensively for silver halide photographic products. For example, polymer latexes have been employed in several applications in which physical property modification was advantageous or essential. Properties that can be affected include dimensional stability, flexibility, drying rate, cracking, abrasion resistance, and differential swelling. The maintenance of dimensional stability is especially important in graphic arts products, microfilm, X-ray products, and other applications with a premium on resolution. Incorporation of a hydrophobic, nonswelling phase proportionately reduces swelling as a function or relative humidity and thus the drying will be also improved. Low glass transition (Tg) latexes and gelatin grafted latex have been used for the reduction of pressure sensitivity or undesirable fog of the photographic products. Polymer latexes are especially useful as the carrier of the photographically useful compounds. The photographically useful compounds include image couplers, developers, masking couplers, antifoggants, brightners, lubricants, latent image stabilizers, sensitizers, filter dyes, UV absorbers, oxidized developer scavengers, hardeners, stabilizers, antioxidants, bleach accelerators, and coupler solvents. This process is often called "loading". There are two major processes for the loading of photographically useful compounds into polymer latexes. In the first process, the photographically useful compounds, coupler solvents, such as o-dibutylphthalate, and a low boiling water-miscible organic solvents, such as tetrahydrofuran, acetone, or methanol are mixed to form a homogeneous solution. This solution was then added slowly to the polymer latex with vigorous stiring to force the loading of photographically compounds into polymer latex. The low boiling organic solvents is removed by evaporation after the loading is completed, with the result that the hydrophobic compounds becomes imbedded in the latex particles. The first process is described in U.S. Pat. Nos. 4,203,716, 4,304,769, and U.S. Pat. No. 4,368,258. In the second loading process the photographically useful compounds, such as couplers, and optional high-boiling solvents, such as o-dibutylphthalate, are combined at a temperature sufficient to prepare a liquid solution of the oil compounds. This oil solution is then combined with an aqueous solution containing gelatin and surfactants to form pre-mix. Polymer latex is either included in the aqueous solution before the oil phase is added, or is added to the oil-gelatin premix. The mixture is then passed through a high shear device, such as homogenizer, colloid mill, or microfluidizer, to force the loading of the photographically useful compounds into the polymer latex. The second loading process is described in U.S. Pat. No. 5,594,047, EP 0 727 703 and EP 0 727 703. The second process is preferred since low boiling organic solvents are not required.

The particle size of the polymer latexes used in the photographic products are usually under 100 nm or preferably under 50 nm. Larger particle size polymer latexes tend to scatter light and reduce the film clarity of the photographic products. Large particle size latex also reduce the loading efficiency and reduce the photographic performance of the photographically useful compounds. However, gelatin solution containing small particle size latexes or dispersions tend to have very high melt viscosities. The cause of the high melt viscosity of small particle size latexes or dispersion is due to adsorption of gelatin onto the surface of these particles and thus the apparent hydrodynamic volume of the particles increase dramatically. The schematic explanation of this phenomena was shown column 4 lines 3–4 of U.S. Pat. No. 5,135,844. High melt viscosity not only cause manufacturing difficulties and reduced the coating speed but also caused coating defects, such as coating unevenness and coating streaking. This is especially true when the particle size of the hydrophobic latex is less than 50 nm.

There are few addenda known in the prior art for the reduction of high melt viscosity of small particle size latex or dispersions. U.S. Pat. Nos. 3,409,435, U.S. Pat. No. 5,135,844, and U.S. Pat. No. 5,300,418 describe the use of oligomeric surfactants for the reduction of high melt viscosity. Three types of surfactants which are effective to reduce the high melt viscosity are mentioned. The first type is a surfactant composed of a 6 to 22 carbon atom hydrophobic tail with one or more attached hydrophilic chains of at least 8 oxyethylene and/or glycidyl ether groups that may or may not be terminated with a negative charge such as a sulfate group. The second type are block oligomeric surfactants composed of hydrophobic polyoxypropylene blocks (A) and hydrophilic polyoxyethylene blocks(B) joined in the manner of A-B-A, B-A-B, A-B, or with a connecting moiety between them. The third addenda type are sugar surfactants, composed of between one to three 6 to 22 carbon atom hydrophilic tails with one or more attached hydrophilic mono or oligosaccharidic chains that may or may not be terminated by a negatively charged group such as a sulfate group. However, such prior art materials that containing a large number of polyalkylene oxide groups produce adverse photographic (sensitometric) effects in some photographic products. These oligomeric surfactants tend to migrate from layer to layer or be adsorbed to the silver halide grain which fogs the emulsion. Sugar surfactants do not have the adverse photographic effects but they tend to reduce the surface tension of the layer and create coating problems, such as repellency. EP 0 695 968 discloses the use of a-cyclodextran for the reduction of melt viscosity. However, α-cyclodextran is expensive and fairly large amounts are needed to be effective. Another way of reducing high melt viscosities is by dilution with water. However, such a procedure leads to increased water load in the drier, and reduced the drying time.

Therefore, there is a need for the alternative ways to reduce the high melt viscosity when small particle size polymer latexes are used in photographic systems.

SUMMARY OF THE INVENTION

The present invention is a polymer latex that includes polymer particles having a core portion and a shell portion. The core portion contains polymerized hydrophobic ethylenically unsaturated monomers with a water solubility less than 1% at room temperature. The shell potion contains polymerized monomers defined by formula (I)

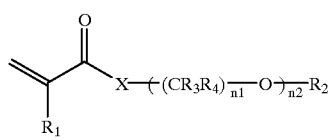

Formula (I)

wherein X is O or NH, or NCH$_3$,
R$_1$ and R$_2$ are H, CH$_3$, C$_2$H., C$_3$H$_7$, or C$_4$H$_9$,
R$_3$ and R$_4$ are H, CH$_3$,
n1 and n2 are integers, n1 is from 1 to 4, n2 is from 1 to 20

DETAILED DESCRIPTION OF THE INVENTION

This invention relates to the preparation and composition of extra fine particle size polymer latexes for the use in the AgX photographic materials. The average particle size of the polymer latexes is less than 50 nm. The polymer latexes of this invention have the core-shell morphology. The composition of the core is derived from monomers with low water solubilities (less than 1% in water at 25° C.). The class of monomers with low water solubility include alkyl acrylate, alkyl methacrylate, alkyl acrylamide, alkyl methacrylamide, styrene, acrylonitrile, butadiene, and ethylene. Two or more hydrophobic monomers can be copolymerized to from the core. The composition of shell is derived from monomers with high water solubilities (higher than 1% in water at 25° C.) and with poly(ethylene oxide) or poly(propylene oxide) repeating units, such as methoxyethyl (meth)acrylate, as methoxyethoxyethyl (meth)acrylate, ethoxyethyl (meth) acrylate, ethoxyethoxyethyl (meth)acrylate, hydroxyethyl (meth)acrylate, poly(ethylyne oxide) (meth)acrylate, methoxy poly(ethylene oxide) (meth)acrylate, and ethoxy poly (ethylene oxide) (meth)acrylate.

We have developed a method preparing ultrafine small particle size polymer latexes which have much lower melt viscosity than the regular polymer latexes with same particle size. This is accomplished by the combination of two stage seeded polymerization and the incorporation of special functional monomers on the surface of the preformed seed particles, This invention does not require the addition of oligomeric surfactants as described in the prior art, therefore, the drawbacks of prior art can be avoided. The functional monomers incorporated in the second stage as shell materials are covalently bonded to the polymer particles and therefore would not migrate through layers and cause adverse sensitometric effects. The two stage seeded polymerization process is not new and is fully described in the "Emulsion Polymerization and Emulsion Polymers, P.A.Lovell and M.S.El-Aasser ed., Wiley, NY(1997) pp. 294–323. However, ultrafine polymer latexes (less than 50 nm in diameter) with the composition of this invention which have very low gelatin-particle interaction is new.

The first stage is the preparation of ultrafine small particle size core particles. The composition of the core is mainly the hydrophobic monomers such that their homopolymer or copolymer have with water solubility less than 0.1% at room temperature. Examples of the hydrophobic monomers include ethylene, propylene, 1-butene, styrenic monomers (such as styrene, vinyl toluene, alpha-methyl styrene), and mono-ethylenic vinyl esters (such as vinyl acetate, vinyl pivalate, vinyl propionate, vinyl laurate), alkyl acrylate or methacrylate (such as methyl acrylate, isopropy acrylate, isopropyl methacrylate, ethyl acrylate, ethyl methacrylate, n-butyl acrylate, n-butyl methacrylate, methyl methacrylate, n-butyl methacrylate, benzyl acrylate, 2-ethylhexyl acrylate, cyclohexyl methacrylate, tetrafiirfryl acrylate, tetrafiiryl methacrylate diethyl maleate, diethyl itaconate), ethylenic unsaturated monocarboxlic acid amides (such as isopropylacrylamide, n-butylacrylamide, n-hexylacrylamide, t-butylacrylamide, n-butylmethacrylamide, n-hexylmethacrylamide, and dimethylacrylamide), acrylonitrile), methacrylonitrile, and dienes (such as butadiene, isoprene). Most preferred hydrophobic monomers include methylmethacrylate, ethylmethacrylate, n-butylacrylate, n-butylmethacrylate, 2-ethylhexylacrylate, isopropylacrylate, isopropylmethacrylate, and styrene. Two or more hydrophobic monomers can be copolymerized to form the core. The total weight percent of the hydrophobic monomers is from 50 to 95%, and preferably from 70 to 90% based on the total amount of core-shell polymer compositions.

The second stage is the formation of shell around the surface of the core particles. In order to minimize the interaction of the gelatin with the hydrophobic core particles, we have discovered that monomers defined in formula (I) are especially effective.

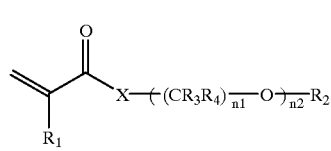

Formula (I)

Where X is O or NH, or NCH$_3$.
R$_1$ and R$_2$ are H, CH$_3$, C$_2$H$_5$, C$_3$H$_7$, or C$_4$H$_9$.
R$_3$ and R$_4$ are H, CH$_2$ or —CHCH$_3$,
n1 and n2 are integers, n1 is from 1 to 4, n2 is from 1 to 20

Examples of the monomers as defined in formula (I) are shown in the Table 1.

TABLE 1

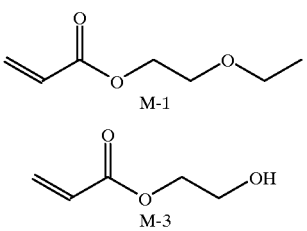

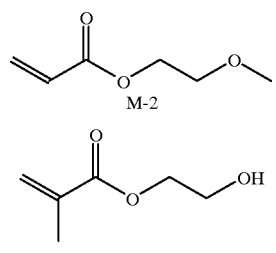

TABLE 1-continued
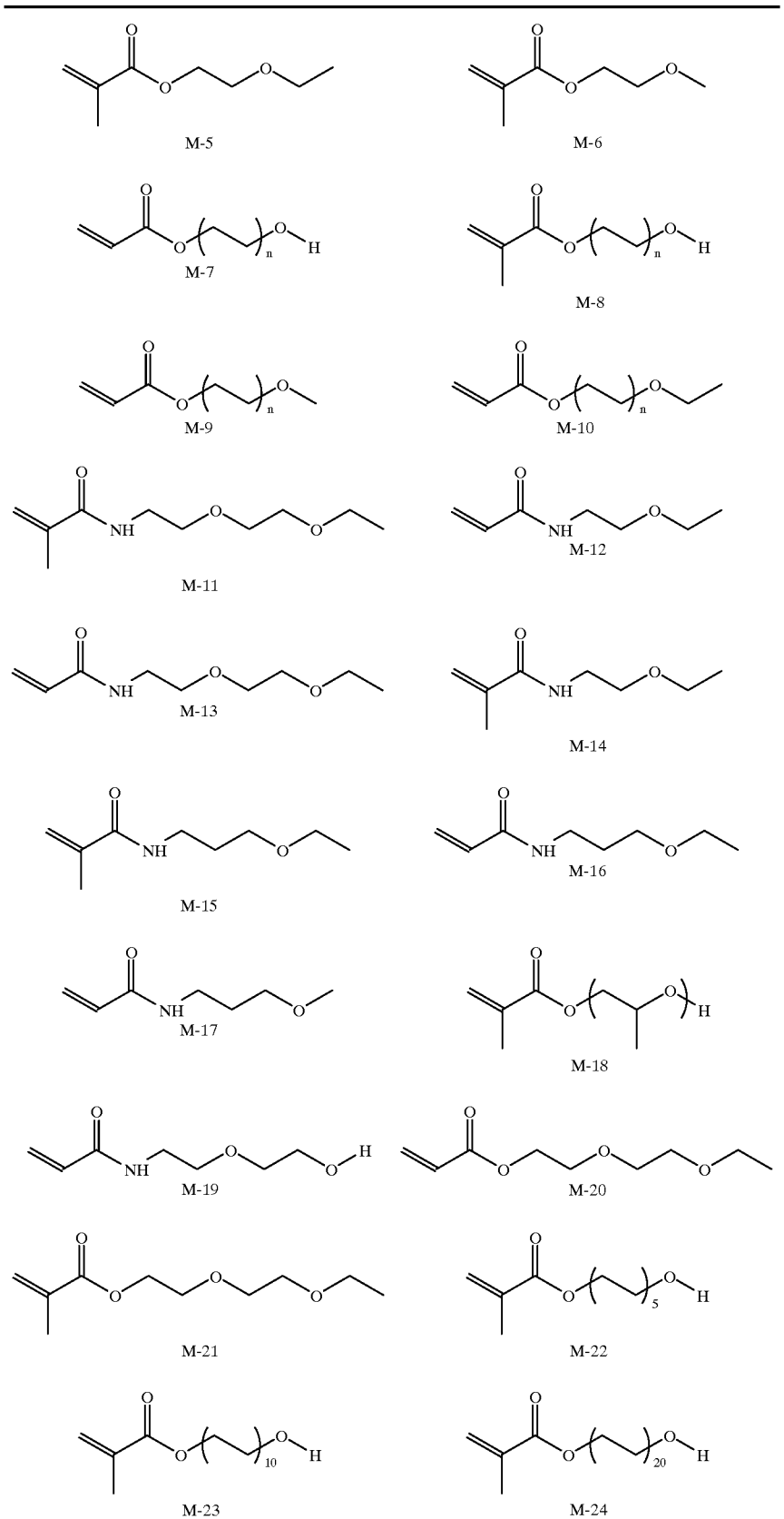

TABLE 1-continued

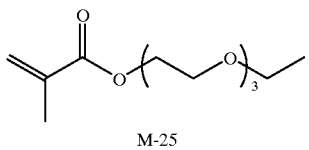

M-25

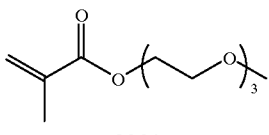

M-26

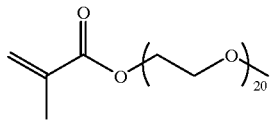

M-27

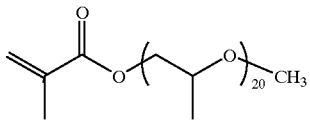

M-28

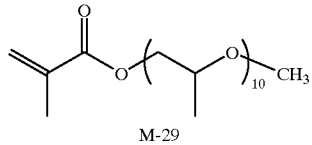

M-29

Two or more of the hydrophilic commonomers can be copolymerized together. The total weight percent of the hydrophilic comonomers is from 2 to 30 percent, and preferably from 5 to 20 percent based on the total amount of coreshell polymer compositions.

In addition to the hydrophobic and hydrophilic monomers described above, water-soluble ionogenic monomers containing carboxylic acid, sulfonic acid, sulfuric acid, and phosphoric acid functional groups may be used to modify the physical properties of polymer latex such as particle size and latex stability. Examples of these ionogenic monomers are vinyl sulfonate($H^+$, Na, or $K^+$ salt), 2-sulfoethylmethacrylate($H^+$, Na, or $K^+$ salt), 3-sulfopropyl-methacrylate($H^+$, Na, or $K^+$ salt), sodium styrene sulfonate, potassium styrene sulfonate, 2-acryloamido-2-methyl-1-propanesulfonic acid($H^+$, Na, or $K^+$ salt), vinyl phosphoric acid, acrylic and methacrylic acid. Surface-active ionogenic monomers, such as examples in U.S. Pat. No. 4,340,664, can also be used to modify the physical properties of polymer latex. The preferred water soluble ionogenic monomer for use in the process is the 2-acryloamido-2-methyl-1-propanesulfonic acid as this material provides a stable polymer latex dispersion. Ionogenic monomers can be used with hydrophobic monomers to form the core or used with hydrophilic monomers defined in formula (I) to form the shell.

A buffering agent can also be used to control the pH of the polymerization medium. Examples of buffering agents include sodium bicarbonate, sodium carbonate, potassium phosphate, potassium hydrogen phosphate, potassium hydrogen phthalate, sodium acetate, sodium succinate, and Borax.

These polymer latexes are prepared by the emulsion polymerization method. Emulsion polymerizations are well known in the art and are described in: (1) F. A. Bovey, Emulsion Polymerization, Interscience Publishers Inc., New York, 1955; (2) C. Schildknecht and I. Skeist, Polymerization Process, pp. 143–197, Wiley-Interscience Publication, NY, 1977; (3) R. Fitch, Polymer Colloid II, Plenum Press, NY, 1980; and (4) P. A. Lovell, M. S. El-Aasser, Emulsion Polymerization and Emulsion Polymers, Wiley, NY, 1997. α-olefin sulfonate. The amount of surfactant used to stabilize the polymer latex is between 0.1 and 20% and, preferably, between 2 to 10% based on the total weight of monomers. A large number of surface-active compounds are suitable as emulsifying agents, such as soaps, alkylsulfonate and sulfates, cationic compounds, amphoteric compounds, nonionic surfactants, and high molecular weight protective colloids. A complete list of surfactants can be found in McCutcheon's Emulsifiers & Detergents, MC Publishing Co., Glen Rock, NJ, USA. Examples are sodium N-methyl-Noleoyltaurate, α-olefin sulfonate, sodium dodecylbenzene sulfonate, sodium dodecyl sulfate, sodium or ammonimn salt of sulfated nonylphenoxypoly (ethyleneoxy) ethanol, sodium alkylnaphthalene sulfonate, ethoxylated alkylphenols, monM-1 thanolamine dodecyldiphenyloxide disulfonate, derivatives of sulfosuccinate, poly (ethyleneoxy-b-propyleneoxy), sodium salt of alkylaryl polyether sulfonate, poly(saccharides), sucrose and glucose esters and derivatives. Preferred surfactants are sodium dodecyl sulfate, sodium N-methyl-N-oleoyltaurate, and α-olefin sulfonate. α-olefin sulfonate is especially efficient to prepare the ultrafine particle size latex of this invention.

The free-radical polymerization of solid monomer is initiated by the addition to the monomer molecule of a free radical that has been formed either by thermal decomposition, by the oxidation-reduction reaction, or by physical action such as by UV light or other high energy radiation, ultrasonic waves, etc. A more complete list of initiating agents is given in F. A. Bovey, Emulsion Polymerization, Interscience Publishers, Inc., New York, (1955), p. 59–93. Watersoluble initiators are preferred and can be added to the solid dispersion, to the polymerization vessel, or both. Examples are the salt of persulfate (sodium, potassium, and ammonium), hydrogen peroxide, 4,4-azobis (4-cyanovaleric acid), 2,2'-azobis(2-methyl-N-(2-hydroxyethyl)propionamide), 2,2'-azobis(2-methyl-N-(1,1-bis(hydroxymethyl)ethyl) propionamide, 2,2'-azobis(N,N'-dimethyleneisobutyramide) dihydrochloride, hydrogen peroxide-$Fe^+$, persulfate-metabisulfite, persulfate-bisulfite, persulfate-sodium formaldehyde sulfoxylate, talkyl hydroperoxide, sodium formaldehyde sulfoxylate, etc. Examples of oil-soluble initiators include azobis (isobutyronitrile), dimethyl 2,2'-azobis-isobutyrate, alkyl hydroperoxide, etc. The amount of catalyst is usually from 0.01 to 5% by weight, preferably 0.1 to 3.0% by weight of the total monomers. The preferred free radical polymerization initiator is sodium persulfate as this material gives a high yield of the polymer latex and rapid polymerization.

The formation of core-shell latexes with the composition of this invention is carried out by the seeded polymerization method. The hydrophobic monomers of this invention were polymerized by batch or semicontinous process first to form the seed. The hydrophilic monomers of this invention was then fed to the preformed seed polymer particles semicontinously to form the shell structure.

Preferred polymers of this invention are shown in Table 2.

TABLE 2

| Polymer I.D. | Core (wt %) | Shell(wt %) |
|---|---|---|
| P-1 | Ema(85) | M-1(10) |
| | NaAMPS(4.5) | NaAMPS(0.5) |
| P-2 | Ema(85) | M-2(10) |
| | NaAMPS(4.5) | NaAMPS(0.5) |
| P-3 | Ema(85) | M-20(10) |
| | NaAMPS(4.5) | NaAMPS(0.5) |
| P-4 | Ema(85) | M-20(15) |
| | NaAMPS(4.5) | NaAMPS(0.5) |
| P-5 | Ema(75) | M-4(10) |
| | NaAMPS(4) | Ema(10) |
| | | NaAMPS(1) |
| P-6 | Ema(75) | M-28(10) |
| | NaAMPS(4) | Ema(10) |
| | | NaAMPS(1) |
| P-7 | Ema(75) | M-27(10) |
| | NaAMPS(4) | Ema(10) |
| | | NaAMPS(1) |
| P-8 | Ema(75) | M-23(10) |
| | NaAMPS(4) | Ema(10) |
| | | NaAMPS(1) |
| P-9 | Ema(75) | M-24(10) |
| | NaAMPS(4) | Ema(10) |
| | | NaAMPS(1) |
| P-10 | Ema(80) | M-1(15) |
| | NaAMPS(4.5) | NaAMPS(0.5) |
| P-11 | Ema(80) | M-2(15) |
| | NaAMPS(4.5) | NaAMPS(0.5) |
| P-12 | Ema(80) | M-20(15) |
| | NaAMPS(4.5) | NaAMPS(0.5) |
| P-13 | Ema(85) | M-1(14.5) |
| | | NaAMPS(0.5) |
| P-14 | Ema(85) | M-2(14.5) |
| | | NaAMPS(0.5) |
| P-15 | Ema(85) | M-20(10) |
| | | NaAMPS(0.5) |
| P-13 | Ema:Aa(80:5) | M-1(14.5) |
| | | NaAMPS(0.5) |
| P-14 | Ema:Aa(80:5) | M-2(14.5) |
| | | NaAMPS(0.5) |
| P-15 | Ema:Aa(80:5) | M-20(14.5) |
| | | NaAMPS(0.5) |
| P-16 | Ema:Aa(80:5) | M-3(14.5) |
| | | NaAMPS(0.5) |
| P-17 | Mma(85) | M-1(10) |
| | NaAMPS(4.5) | NaAMPS(0.5) |
| P-18 | Mma(85) | M-2(10) |
| | NaAMPS(4.5) | NaAMPS(0.5) |
| P-19 | Mma(85) | M-20(10) |
| | NaAMPS(4.5) | NaAMPS(0.5) |
| P-20 | Mma(80) | M-20(15) |
| | NaAMPS(4.5) | NaAMPS(0.5) |
| P-21 | Mma(85) | M-4(10) |
| | NaAMPS(4.5) | NaAMPS(0.5) |
| P-22 | Mma(85) | M-28(10) |
| | NaAMPS(4.5) | NaAMPS(0.5) |
| P-23 | Bma(85) | M-1(10) |
| | NaAMPS(4.5) | NaAMPS(0.5) |
| P-24 | Bma(85) | M-2(10) |
| | NaAMPS(4.5) | NaAMPS(0.5) |
| P-25 | Bma(85) | M-20(10) |
| | NaAMPS(4.5) | NaAMPS(0.5) |
| P-26 | Bma(80) | M-20(15) |
| | NaAMPS(4.5) | NaAMPS(0.5) |
| P-27 | Bma(85) | M-4(10) |
| | NaAMPS(4.5) | NaAMPS(0.5) |
| P-28 | Bma(85) | M-28(10) |
| | NaAMPS(4.5) | NaAMPS(0.5) |
| P-29 | Ba(85) | M-1(10) |
| | NaAMPS(4.5) | NaAMPS(0.5) |
| P-30 | Ba(85) | M-2(10) |
| | NaAMPS(4.5) | NaAMPS(0.5) |
| P-31 | Ba(85) | M-20(10) |
| | NaAMPS(4.5) | NaAMPS(0.5) |
| P-32 | Ba(85) | M-20(15) |
| | NaAMPS(4.5) | NaAMPS(0.5) |
| P-33 | Ba(85) | M-4(10) |
| | NaAMPS(4.5) | NaAMPS(0.5) |
| P-34 | Ba(85) | M-28(10) |
| | NaAMPS(4.5) | NaAMPS(0.5) |

Ema: Ethyl methacrylate
Mma: Methyl methacrylate
NaAMPS: 2-acryloamido-2-methyl-1-propanesulfonic acid, sodium salt
Bma: n-Butyl methacrylate
Ba: n-Butyl acrylate
Aa: Acrylic acid The core-shell latexes of this invention are particularly useful for the loading of photographically useful compounds. Examples of the photographically useful compounds which can be loaded into polymer latexes of this invention include couplers (yellow, cyan, and magenta), masking couplers, inhibitor-releasing couplers, bleach accelerator-releasing couplers, white couplers, dye-releasing couplers, WV absorbers, photostabilizers, filter dyes, high-boiling organic solvents, reducing agents(including oxidized developer scavengers and nucleators), developers, development inhibitors and moderators, optical brighteners, and lubricants, etc. Examples of the photographically useful compounds are listed in EP 0 727 704, p-4 to p-21.

The typical procedure for the preparation of core-shell latex of this invention are demonstrated by the following examples.

EXAMPLE 1

Preparation of P-1 core-shell latex

First stage-preparation core latex 200 ml deionized water and 3.75 g of Rhodacal A-246L (α-olefin sulfonate, 40 percent solid) were charged to a 500 ml 3-neck round flask equipped with a condenser, mechanical stirrer, and nitrogen inlet. The flask was immersed in an 80° C. constant temperature bath and purged with nitrogen for 30 mins. A monomer emulsion comprising 95 g of ethylmethacrylate, 10 g of 2-acryloamido2-methyl-1-propanesulfonic acid(sodium salt,50%), 3.75 g of Rhodacal A-246L (α-olefin sulfonate, 40% solid), 10 g of 10% sodium persulfate, and 200 ml of deionized water was fed to the reactor over 2.25 hours. The latex was further polymerized for 30 mins after the monomer addition was finished.

Second stage- preparation of shell latex

A second monomer emulsion comprising 11.1 g of 2-ethoxyethylacrylate, 1.17 g of 2-acryloamido-2-methyl-1-propanesulfonic acid (sodium salt, 50%), 1.1 g of 10% sodium persulfate, 0.83 g of Rhodacal A-246L (α-olefin sulfonate, 40% solid), and 20 g deionized water was fed to the preformed latex from stage one over 10 mins and further polymerized for one hour. The latex was then cooled to room temperature and filtered. The % solid of the core-shell latex was 20.5% and the Z-average particle size was 43.8 nm.

EXAMPLE 2

Preparation of P-2 core-shell latex

The preparation and composition of the ethylmethacrylate core latex was same as in example 1. The second stage monomer feed was composed of 11.1 g of 2-methoxyethylacrylate, 1.17 g of 2-acryloamido-2-methyl-1 propanesulfonic acid (sodium salt, 50%), 1.1 g of 10% sodium persulfate, 0.83 g of Rhodacal A-246L(α-olefin sulfonate, 40% solid), and 20 g D.I. water. The percent solids of the core-shell latex was 20.1% and the Z-average particle size was 40.9 nm.

EXAMPLE 3

Preparation of P-3 core-shell latex

The preparation and composition of the ethylmethacrylate core latex was same as in example 1. The second stage monomer feed was composed of 11.1 g of 2-ethoxyethoxyethylacrylate, 1.17 g of 2-acryloamido-2-methyl-1-propanesulfonic acid (sodium salt, 50%), 1.1 g of 10% sodium persulfate, 0.83 g of Rhodacal A-246L (α-olefin sulfonate, 40% solid), and 20 g deionized water. The percent solid of the core-shell latex was 20.0% and the Z-average particle size was 42.5 nm.

EXAMPLE 4

Preparation of P-4 core-shell latex

The preparation and composition of the ethyhnethacrylate core latex was same as example 1. The second stage monomer feed was composed of 17.8 g of 2-ethoxyethoxyethylacrylate, 1.87 g of 2-acryloamido-2-methyl-1-propanesulfonic acid (sodium salt, 50%), 1.87 g of 10% sodium persulfate, 1.33 g of Rhodacal A-246L (α-olefin sulfonate, 40% solid), and 30 g deionized. water. The % solid of the core-shell latex was 20.8% and the Z-average particle size was 46.2 nm.

EXAMPLE 5

Preparation of P-5 core-shell latex

The preparation of the ethylmethacrylate core latex was same as in example 1 except 83.9 g of ethylmethacrylate and 8.84 g of 2-acryloamido-2-methyl-1-propanesulfonic acid (sodium salt) was used. The second stage monomer feed was composed of 11.1 g of ethylmethacrylate, 11.1 g of 2-hydroxyethylmethacrylate, 2.34 g of 2-acryloamido-2-methyl-1-propanesulfonic acid (sodium salt, 50%), 2.2 g of 10% sodium persulfate, 1.66 g of Rhodacal A246L (α-olefin sulfonate, 40 percent solid), and 40 g deionized water. The % solid of the core-shell latex was 19.6% and the Z-average particle size was 44.6 nm.

EXAMPLE 6

Preparation of P-6 core-shell latex

The preparation of the ethylmethacrylate core latex was the same as example 5. The second stage monomer feed was composed of 11.1 g of ethylmethacrylate, 11.1 g of Sartomer SR-604 (polypropylene glycol methacrylate, MW. 405), 2.34 g of 2-acryloamido-2-methyl-1-propanesulfonic acid (sodium salt, 50%), 2.2 g of 10% sodium persulfate, 1.66 g of Rhodacal A246L (α-olefin sulfonate, 40% solid), and 40 g D.I. water. The % solid of the core-shell latex was 19.4% and the Z-average particle size was 42.6 nm.

EXAMPLE 7

Preparation of P-7 core-shell latex

The preparation of the ethylmethacrylate core latex was the same as example 5. The second stage monomer feed was composed of 1.1 g of ethylmethacrylate, 11.1 g of methoxypolyoxyethylene methacrylate (Polyscience catalogue number 16663), 2.34 g of 2-acryloamido-2-methyl-1-propanesulfonic acid (sodium salt, 50%), 2.2 g of 10% sodium persulfate, 1.66 g of Rhodacal A246L (α-olefin sulfonate, 40% solid), and 40 g deionized water. The % solid of the core-shell latex was 19.1% and the Z-average particle size was 40.8 nm.

EXAMPLE 8

Preparation of P-8 core-shell latex

The preparation of the ethylmethacrylate core latex was the same as example 5. The second stage monomer feed was composed of 11.1 g of ethylmethacrylate, 11.1 g of polyethyleneoxide methacrylate (Monomer&Polymer, Dajac, catalogue #8926), 2.34 g of 2-acryloamido-2-methyl-1-propanesulfonic acid (sodium salt, 50%), 2.2 g of 10% sodium persulfate, 1.66 g of Rhodacal A-246L (α-olefin sulfonate, 40% solid), and 40 g deionized water. The % solid of the core-shell latex was 19.2% and the Z-average particle size was 41.2 nm.

EXAMPLE 9

Preparation of P-9 core-shell latex

The preparation of the ethylmethacrylate core latex was the same as example 5. The second stage monomer feed was composed of 11.1 g of ethylmethacrylate, 11.1 g of polyethyleneoxide methacrylate (HEMA-20 by Alcolac), 2.34 of 2-acryloamido-2-methyl-1-propanesulfonic acid sodium salt, 50%), 2.2 g of 10% sodium persulfate, 1.66 g of Rhodacal A-246L (α-olefin sulfonate, 40% solid), and 40 g deionized water. The % solid of the core-shell latex was 19.1% and the Z-average particle size was 45 nm.

The preparation of small particle size latexes which do not have the core-shell structures as described in this invention are described below as comparison examples.

Comparison Example 1

Preparation of Ema/NaAMPS(95/5) non core-shell latex 200 ml deionized water and 3.75 g of Rhodacal A-246L (α-olefin sulfonate, 40% solid) were charged to a 500 ml 3-neck round bottom flask equipped with a condenser, mechanical stirrer, and nitrogen inlet. The flask was immersed in an 80° C. constant temperature bath and purged with nitrogen for 30 mins. A monomer emulsion comprising 95 g of ethylmethacrylate, 10 g of 2-acryloamido-2-methyl-1-propanesulfonic acid (sodium salt), 3.75 g of Rhodacal A-246L (α-olefin sulfonate, 40% solid), 10 g of 10% sodium persulfate, and 200 ml of deionized water was fed to the reactor over 2.25 hours. The latex was further polymerized for 30 mins after the monomer addition was finished. The latex was cooled and filtered. The % solid of the core-shell latex was 20% and the Z-average particle size was 40.0 nm.

Comparison Example 2

Preparation of Ema/Aa/NaAMPS(85/10/5) core-shell latex

The preparation and composition of the ethylmethacrylate core latex was same as in example 5. The second stage monomer feed was composed of 11.1 g of ethylmethacrylate, 11.1 g of acrylic acid, 2.34 g of 2-acryloamido-2-methyl-1-propanesulfonic acid(sodium salt, 50%), 2.2 g of 10% sodium persulfate, 1.66 g of Rhodacal A-246L (α-olefin sulfonate, 40% solid), and 40 g deionized water. The % solid of the core-shell latex was 20.1% and the Z-ave particle size was 43 nm.

Comparison Example 3

Preparation of Ema/Maa/NaAMPS(85/10/5) coreshell latex

The preparation and composition of the ethylmethacrylate core latex was same as in example 5. The second stage monomer feed was composed of 11.1 g of ethylmethacrylate, 11.1 g of methacrylic acid, 2.34 g of 2-acryloamido2-methyl-1-propanesulfonic acid (sodium salt, 50%), 2.2 g of 10% sodium persulfate, 1.66 g of Rhodacal A-246L (α-olefin sulfonate, 40% solid), and 40 g deionized water. The % solid of the core-shell latex was 19.9% and the Z-average particle size was 43.2 nm.

Comparison Example 4

Preparation of Ba/NaAMPS(95/5) non core-shell latex

The preparation of Ba/NaAMPS(95/5) non core-shell latex was same as in comparison example 1 except that 95 g of n-butyl acrylate was used. The particle size was 44 nm and the % solid of the core-shell latex was 19.8%.

Comparison Example 5

Preparation of Bma/NaAMPS(95/5) non core-shell latex

The preparation of Bma/NaAMPS(95/5) non core-shell latex was same as in comparison example 1 except that 95 g of n-butyl methacrylate was used. The particle size was 55 nm and the % solid of the core-shell latex was 19.9%.

Comparison Example 6

Preparation of non Core-Shell Ema/M2/NaAMPS (85/10/5)latex

The composition is the same as invention example 2 except that all monomers were fed together to the reactor over three hours. The resulting non core-shell latex had a particle size of 65 nm, which is much larger than the corresponding core-shell latex prepared by the seeded polymerization of this invention.

Comparison Example 7

Preparation of non Core-Shell Ema/M-28/NaAMPS (85/10/5)latex

The composition is the same as invention example 7 except that all monomers were fed together to the reactor over three hours. The resulting non core-shell latex had a particle size of 80 nm, which is much larger than the corresponding core-shell latex prepared by the seeded polymerization of this invention.

The advantages of the latexes of this invention will become more apparent by the following two viscosity experiments.

Viscosity of Gelatin Solution Containing Ultrafine Particle Size Latexes

Viscosity measurement were made on a solution containing 5.32% gelatin and 8% latex to simulate the photographic dispersion. The viscosity was measured at 45° C. by using a Brookfield HBTDV-IICP200 Digital Viscomer. Table 3 shows the viscosity values of a series ultrafine latexes of this invention and comparative examples.

TABLE 3

| Polymer ID | Composition | Wt Ratio | Core-shell | Particle Size (nm) | Viscosity cps @ 75 sec-1 | Remark |
|---|---|---|---|---|---|---|
| Comparison 1 | Ema:NaAMPS | 95/5 | No | 40 | 41.80 | Comparison |
| Comparison 2 | Ema:Aa:NaAMPS | 85/10/5 | No | 43 | 44.50 | Comparison |
| Comparison 3 | Ema:Maa:NaAMPS | 85/10/5 | Yes | 43 | 41.8 | Comparison |
| Comparison 4 | Ba:NaAMPS | 95/5 | No | 44 | 123 | Comparison |
| Comparison 5 | Bma:NaAMPS | 95/5 | No | 55 | 63 | Comparison |
| Comparison 6 | Ema:M-2:NaAMPS | 85/10/5 | No | 65 | 36 | Comparison |
| Comparison 7 | Ema:M-28:NaAMPS | 85/10/5 | No | 80 | 38 | Comparison |
| P-2 | Ema:M-2:NaAMPS | 85/10/5 | Yes | 41 | 31.40 | Invention |
| P-3 | Ema:M-20:NaAMPS | 85/10/5 | Yes | 43 | 31.40 | Invention |
| P-4 | Ema:M-20:NaAMPS | 80/15/5 | Yes | 46 | 23.50 | Invention |
| P-5 | Ema:M-4:NaAMPS | 85/10/5 | Yes | 45 | 23.50 | Invention |
| P-6 | Ema:M-28:NaAMPS | 85/10/5 | Yes | 43 | 28.8 | Invention |
| P-7 | Ema:M-27:NaAMPS | 85/10/5 | Yes | 41 | 18.30 | Invention |

TABLE 3-continued

| Polymer ID | Composition | Wt Ratio | Core-shell | Particle Size (nm) | Viscosity cps @ 75 sec-1 | Remark |
|---|---|---|---|---|---|---|
| P-8 | Ema:M-23:NaAMPS | 85/10/5 | Yes | 41 | 23.5 | Invention |
| P-9 | Ema:M-24:NaAMPS | 85/10/5 | Yes | 45 | 26.2 | Invention |

Ema: Ethyl methacrylate
Mma: Methyl methacrylate
NaAMPS: 2-acryloamido-2-methyl-1-propanesulfonic acid, sodium salt
Bma: n-Butyl methacrylate
Ba: n-Butyl acrylate
Aa: Acrylic acid
Maa: Methacrylic acid It is clear from Table 3 that polymer latexes of this invention have much lower melt viscosities than the comparative examples of similar particle sizes (comparison example 1, 2, 3) without the functional monomers of this invention. Also, comparison example 6 and 7, which have the same composition as invention example P-2 and P-7, have much larger particle size and higher viscosity. This table also demonstrates that other hydrophilic monomers, such as acrylic acid and methacrylic acids (comparison examples 2 and 3) are not as effective to reduce the melt viscosity as the functional monomers defined in formula (1).

Viscosity of Gelatin Solution Containing Ultrafine Particle Size Latexes Loaded with Oxidized Developer Scavenger Selected latexes were chosen for the loading of Dox scavenger (Table 4) to the study the effect of comonomers on the reactivity of Dox scavengers and their melt viscosity. The dispersion was composed of 5.32% Dox scavenger, 2.26% dibutyl phthalate, 5.32% of latexes, and 8.0% of gelatin. Dox scavenger and dibutyl phthalate were mixed and heated at 110–120° C. until a homogeneous solution was obtained. An aqueous solution containing gelatin and latex was added to form a pre-mix. The premix was then passed through a microfluidizer in a constant temperature bath at 70° C., and with pressure of 7200 psi for three cycles. This process is described in U.S. Pat. No. 5,594,047.

In order to effectively evaluate magenta crosstalk (i. e., magenta dye density from a blue separation exposure) as a function of Dox scavengers reactivity, a simplified multilayer coating format (Table 4) was developed. Dox scavengers from various dispersions were coated at 6 and 12 mg/sq.ft. Coatings were then exposed and processed through standard RA4 process. Crosstalk was determined by the ratio of Dmax(Green) to Dmax(Blue), where high crosstalk is ndicative of low Dox scavengers reactivity. The dispersion viscosity at 7.5 and 75 sec$^{-1}$ and the reactivity of the loaded Dox scavenger dispersion were tabulated in Table 5.

TABLE 4

| SOC | Gel | 100 mg/ft.2 |
| | Alk-XC | 0.86 mg/ft.2 |
| | FT-248 | 0.35 mg/ft.2 |
| | BVSME | 1.8% total gel |
| Magenta coupler | Magenta Coupler 1 | 27 mg/ft.2 |
| | Alk-XC | 1 mg/ft.2 |
| | Gel | 120 mg/ft.2 |
| IL | Dox Scavenger | 6, 12 mg/ft.2 |
| | Alk-XC | 1 mg/ft.2 |
| | Gel | 70 mg/ft.2 |
| Yellow coupler/AgX | Yellow Coupler 1 | 45 mg/ft.2 |
| | AgX | 24 mg/ft.2 |

TABLE 4-continued

| Gel | 146 mg/ft.2 |
| Q2171 (DOX-4012) | 0.13 mg/ft.2 |
| Paper w/ 300mg gel pad | |

Coating format for the investigation of Dox scavengers reactivity.

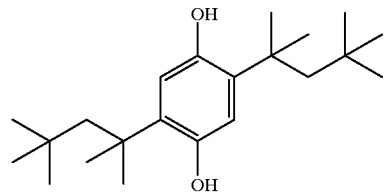

Dox Scavenger

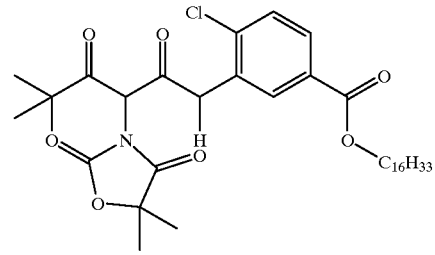

Yellow Coupler 1

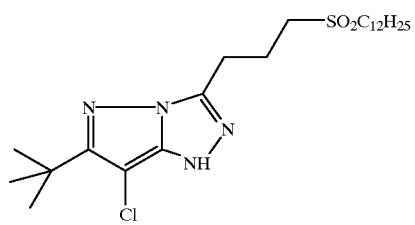

Magenta Coupler 1

TABLE 5

| Polymer ID | Composition | Wt Ratio | Particle Size (nm) of latex | Viscosity cps @ 7.5 sec-1 | Viscosity cps @ 75 sec-1 | Crosstalk @ 12 mg/ft2 | Remarks |
|---|---|---|---|---|---|---|---|
| Comparison 1 | Ema:NaAMPS | 95/5 | 40 | 1260 | 510 | 0.287 | Comparison |
| Comparison 2 | Ema:Aa:NaAMPS | 85/10/5 | 43 | 1650 | 645 | 0.296 | Comparison |
| Comparison 3 | Ema:Maa:NaAMPS | 85/10/5 | 43 | 1340 | 600 | 0.263 | Comparison |
| P-2 | Ema:M-2:NaAMPS | 85/10/5 | 41 | 705 | 356 | 0.276 | Invention |
| P-5 | Ema:M-4:NaAMPS | 85/10/5 | 45 | 735 | 382 | 0.318 | Invention |
| P-6 | Ema:M-28:NaAMPS | 85/10/5 | 43 | 680 | 358 | 0.286 | Invention |

The advantages of the polymer latexes of this invention is very clear from Table 5 that the dispersion comprising Dox scavenger loaded in the latexes of this invention have good scavenging activities but their melt viscosities are much lower than the comparative polymer latexes of similar particle sizes.

The invention has been described in detail with particular reference to certain preferred embodiments thereof, but it will be understood that variations and modifications can be effected within the spirit and scope of the invention.

What is claimed is:

1. A core-shell polymer latex in a gelatin-based photographic system comprising: a gelatin-based silver halide photographic dispersion and polymer particles comprising a core portion and a hydrophilic nonomer forming polymerized shell portion, the core portion comprising polymerized hydrophobic ethylenically unsaturated monomers with water solubility less than 1% at room temperature, the shell portion comprising polymerized monomers defined by formula (I)

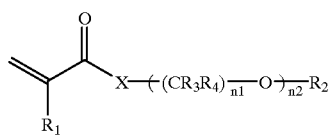

Formula (I)

wherein X is O or NH, or $NCH_3$, $R_1$ and $R_2$ are H, $CH_3$, $C_2H_5$, $C_3H_7$, or $C_4H_9$, $R_3$ and $R_4$ are H or $CH_3$, n1 and n2 are integers, n1 is from 1 to 4, n2 is from 1 to 20; and wherein particles of said polymer latex is less than 50 μ.

2. The polymer latex of claim 1 wherein th ehydrophobic monomer to form the core portion of the polymer latex is form 50 to 95% by weight of the total polymer composition.

3. The polymer latex of claim 1 wherein the hydrophilic monomer to form the shell portion of the polymer latex is from 5 to 50% by weight of the total polymer composition.

4. The polymer latex of claim 1 wherein the monomers forming the core portion of the core-shell latex are selected from ethylene, propylene, 1-butene, styrenic monomers, mono-ethylenic vinyl esters, alkyl acrylate, alkyl methacrylate, ethylenic alkyl acrylamides, alkyl methacrylamides, acrylonitrile, methacrylonitrile, and dienes; wherein the weight % of hydrophobic monomers is from 50 to 95% of the total core-shell polymer latex.

5. The polymer latex of claim 1 wherein the hydrophobic monomers forming the core portion of the core-shell latex comprise ethylene, propylene, 1-butene, styrenic monomers selected from styrene. vinyl toluene, and alpha-methyl styrene, mono-ethylenic vinyl esters selected from vinyl acetate, vinyl pivalate, vinyl propionate, and vinyl laurate, alkyl acrylate or methacrylate selected from methyl acrylate, isopropy acrylate, isopropyl methacrylate, ethyl acrylate, ethyl methacrylate, n-butyl acrylate, n-butyl methacrylate, methyl methacrylate, n-butyl methacrylate, benzyl acrylate, 2-ethylhexyl acrylate, cyclohexyl methacrylate, tetrafurfuryl acrylate, tetrafurfuryl methacrylate diethyl maleate, and diethyl itaconate, ethylenic unsaturated monocarboxlic acid amides selected from isopropylacrylamide, n-butylacrylamide, n-hexylacrylamide, t-butylacrylamide, n-butylmethacrylamide, n-hexylmethacrylamide, dimethylacrylamide, acrylonitrile and, methacrylonitrile, and dienes selected from butadiene, and isoprene.

6. The polymer latex of claim 1, wherein said hydrophobic monomers are selected from methylmethacrylate, ethylmethacrylate, n-butylacrylate, n-butylmethacrylate, 2-ethylhexylacrylate, isopropylacrylate, isopropylmethacrylate, and styrene.

7. The polymer latex of claim 1 wherein said hydrophilic monomers forming the shell portion of the core-shell latex are selected from methoxyethyl acrylate, methoxyethyl methacrylate, methoxyethoxyethyl acrylate, methoxyethoxyethyl methacrylate, ethoxyethyl acrylate, ethoxyethyl methacrylate, ethoxyethoxyethyl acrylate, ethoxyethoxyethyl methacrylate, hydroxyethyl acrylate, hydroxyethyl methacrylate, polyethyleneoxide acrylate, polyethyleneoxide methacrylate, methoxy poly(ethylene oxide) acrylate, methoxy polyethylene oxide methacrylate, ethoxy poly(ethylene oxide) acrylate and ethoxy poly(ethylene oxide) methacrylate.

8. The polymer latex of claim 1 further comprising photographically usefuil compounds selected from the group consisting of image couplers, developers, masking couplers, antifoggants, brighteners, lubricants, latent image stabilizers, sensitizers, filter dyes, UV absorbers, oxidized developer scavengers, hardeners, stabilizers, antioxidants, bleach accelerators and coupler solvents.

* * * * *